United States Patent [19]

Freitas

[11] 4,149,237

[45] Apr. 10, 1979

[54] INDUSTRIAL PROCESS CONTROL SYSTEM

[75] Inventor: Manuel P. Freitas, South Easton, Mass.

[73] Assignee: The Foxboro Company, Foxboro, Mass.

[21] Appl. No.: 833,978

[22] Filed: Sep. 16, 1977

[51] Int. Cl.² .......................... G06F 15/46; G06F 3/04
[52] U.S. Cl. .................................. 364/107; 364/103; 364/900
[58] Field of Search ............... 364/103, 107, 108, 500, 364/502, 117, 200 MS File, 900 MS File; 340/147 R; 325/39, 59, 63, 321

[56] References Cited

U.S. PATENT DOCUMENTS

| | | | |
|---|---|---|---|
| 3,582,621 | 6/1971 | Lawler | 364/108 X |
| 3,755,785 | 8/1973 | Kirk | 364/200 |
| 3,761,889 | 9/1973 | Hallee et al. | 364/117 X |
| 3,798,424 | 3/1974 | Freitas et al. | 364/107 |
| 3,971,000 | 7/1976 | Cromwell | 364/200 |

*Primary Examiner*—Joseph F. Ruggiero
*Attorney, Agent, or Firm*—Parmelee, Johnson, Bollinger & Bramblett

[57] ABSTRACT

An industrial process control system to be used with processes which are geographically spread out over a relatively wide field area, with portions thereof located in respective zones, and wherein the process has associated therewith a large number of instrumentation elements including sensing elements and operating elements for controlling actuators such as process valves. The control system includes a central station with a digital computer which directs signals to a number of primary transmitter/receiver units each producing a swept-carrier wireless signal for transmission to a respective one of the field area zones. Within each zone are a plurality of local transmitter/receiver units similar to the primary units, with each local unit being assigned to one or more sensing elements and/or one or more operating elements. The local units continuously monitor the signals from the corresponding primary unit, and, when instructed by signals from the primary unit, carry out specified actions concerning the process element(s) assigned thereto. Actions to be taken include repositioning a process valve, changing the set-point of a controller, and transmitting back to the primary unit signals representing data needed for control of the process. The swept-carrier transmissions of the primary units are synchronized and controlled so that the carrier frequencies thereof are all different at substantially all instants of time.

5 Claims, 11 Drawing Figures

INDUSTRIAL PROCESS CONTROL SYSTEM

BACKGROUND OF THE INVENTION

1. Field of the Invention

This invention relates to industrial process control systems for processes which are spread out over relatively large areas, yet are to be controlled from a central operating station. More particularly, this invention relates to an improved control system configuration which is related to the physical layout of the process so as to provide for efficient transfer of data and control instructions between the central station and the remote regions of the process, including data from sensing elements and instructions for operating elements such as actuators.

2. Description of the Prior Art

A considerable number of process control systems have been exposed and described in the art, and many have gone into commercial use. In more recent years, digital computers have been extensively used with process control systems to monitor functioning of the process and to direct the overall functioning of the control system. Such computer-directed systems have generally been classified as (1) supervisory control systems, wherein the computer develops set-point signals for individual controllers associated with each process valve, or (2) direct digital control systems, wherein the computer develops valve-control signals to be sent directly to valve-positioning equipment for each valve. Selected prior art disclosures of typical systems may be found in U.S. Pat. No. 3,582,621 (Lawler), U.S. Pat. No. 3,761,889 (Halley et al), and U.S. Pat. No. 3,971,000 (Cromwell).

The earlier computer-control systems generally used conventional solid wire conductors for transferring data, e.g. in the form of DC signals, between the central station and the system elements in the field. Thus, electrical conductors in heavy shields were led from the sensing elements, valves, etc., to junction boxes, and from there to central or other processors. For relatively large systems, the cost of such conventional wired data transfer networks has become very great, because they are expensive to install and involve high costs of planning, layout, and documentation. Improvements have been effected by transmitting the data part of the way in digital format through cables which serve a number of process elements, as disclosed in U.S. Pat. No. 3,760,374 (Nabi). But nevertheless it is clear that further improvements are needed.

SUMMARY OF THE INVENTION

In accordance with an important aspect of the present invention, the process field area is divided into a number of regional zones each containing a group of process elements such as condition sensing elements, or operating elements for actuators or the like. These zones may be physically separate, or they may overlap, but they are at least substantially separate. The various process elements in all of the zones are controlled from a central station having a digital computer of known facilities for receiving process data and for developing appropriate commands. This computer is coupled to a plurality of zone transmitter/receiver units (ZTRs) each adapted to transmit signals to a respective zone of said field area. Each zone, in turn, is provided with a set of local transmitter/receiver units (LTRs) each assigned to one or more process elements in the corresponding zone. All LTRs are capable of receiving signals from the respective ZTR, and of transmitting local signals back to that ZTR.

The transmitter/receiver units may be of the type wherein the transmitter is adapted to produce high-frequency swept-carrier wireless signals, and wherein the receiver is capable of automatically tracking a received swept-carrier signal. Details of suitable transmitting and receiving equipment of that type may be found in copending application Ser. No. 790,156 filed by V. A. Bennett on Apr. 22, 1977, now abandoned.

The zone transmitter/receiver units are located and arranged so that the radius of their effective transmission capability covers the assigned zone. For example, each ZTR may be located approximately at the center of its zone, to operate only with assigned LTRs within that zone. Since in some cases the zones may overlap, such that one or more LTRs will be in more than a single zone, the system further advantageously comprises means to assure that each set of LTRs can communicate only with an assigned ZTR.

All of the zone transmitter/receiver units are furnished by the computer with sets of command signals containing, e.g. in digital format, instruction signals specifying actions to be taken at a particular LTR, and also containing address signals identifying that LTR as the intended recipient of the accompanying instruction signals. All of the LTRs continuously monitor the assigned zone signal, and all include means for decoding the signal data superimposed on that signal.

When any LTR decodes its own address, control equipment within the LTR is automatically activated to carry out the accompanying instructions. For example, the LTR may produce a control signal directing an actuator to move to a new position, or it may produce a prescribed set-point signal for a local controller associated with a respective variable condition. Alternatively, the LTR may produce signals causing the LTR to switch from "receive" mode to "transmit" mode, to send back to the ZTR a swept-carrier signal modulated with data signals representing information requested by the central computer, e.g. measurement signal data from a condition sensing element assigned to that LTR. In the latter event, the corresponding ZTR will be switched, under computer control, to its "receive" mode to receive the data signals, and will relay the information on to the computer for use in its ongoing monitoring and control functions.

Other objects, aspects and advantages of the invention will in part be pointed out in, and in part apparent from, the following detailed description, considered together with the accompanying drawings.

DESCRIPTION OF PREFERRED EMBODIMENTS

Figure 1:
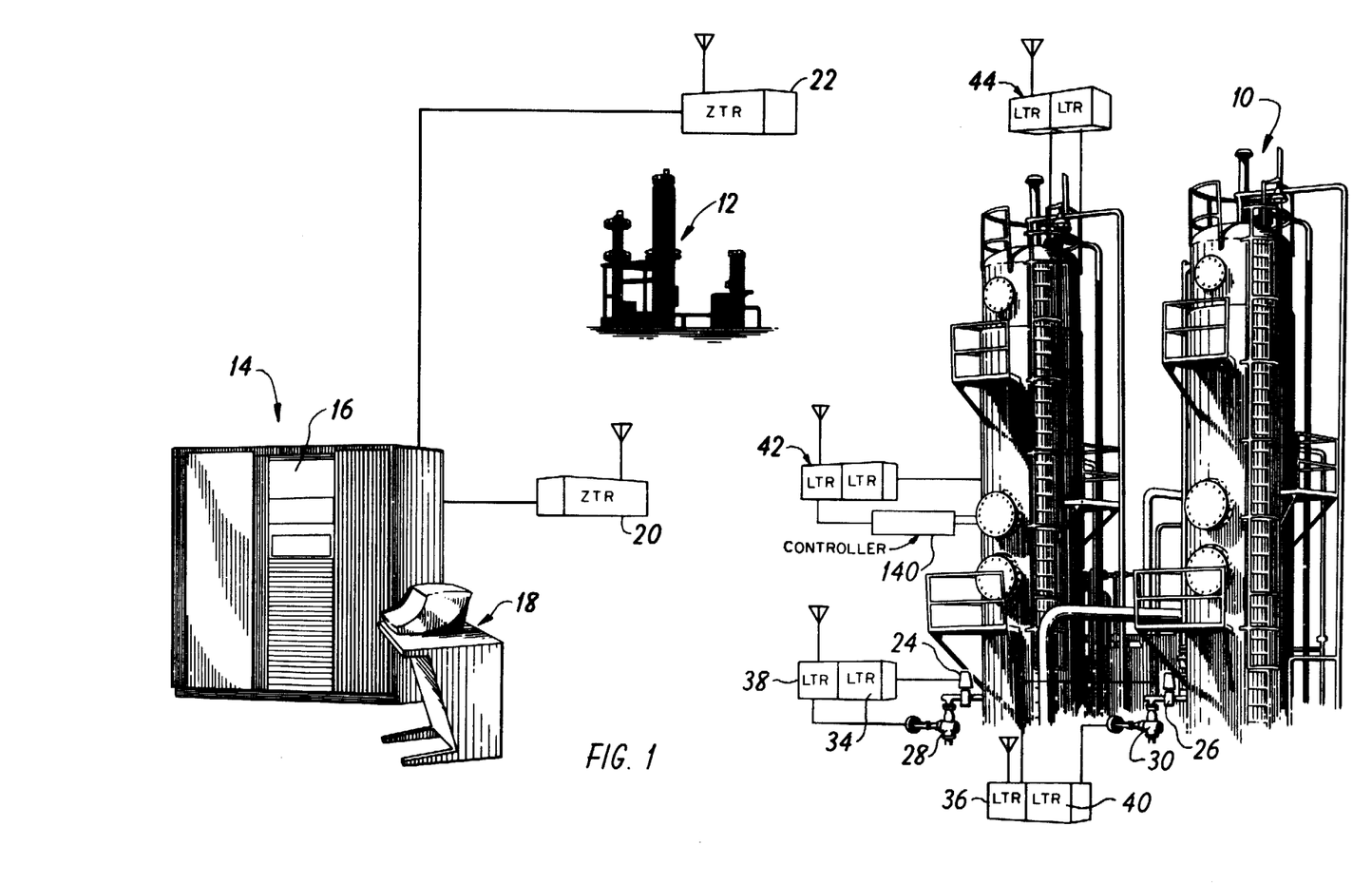
FIG. 1 is a perspective view of an exemplary industrial process, showing in block diagram format the swept-carrier transmitter/receiver units associated with the central station and with the remote field area process units.

Referring now to FIG. 1, an exemplary industrial process is shown for the purpose of pictorially illustrating the typical geographical characteristic wherein portions of a process are spread out over a wide field area. The process shown includes a nearby process unit consisting of a pair of catalytic crackers generally indicated at 10, and a more distant process unit generally indicated at 12. At the left in FIG. 1 is shown a central control station 14, having a digital computer 16 with associated equipment including for example an operator's console 18 with data-entry keyboard facilities and the like.

Connected to the central station 14 are two swept-carrier transmitter/receiver units 20, 22 referred to herein as primary or "zone" transmitter/receiver units (ZTR for short), and which will be described in detail hereinbelow. The actual number of such units used for any given installation will depend upon the nature and complexity of the process, with two having been shown in FIG. 1 only for convenience of illustration. These units are controlled by the computer 16, and for most of their operation they will be held in transmit mode producing swept-carrier transmissions directed to the field area zones occupied by the process units 10 and 12.

The process units 10, 12 have associated therewith the usual kinds of instrumentation equipment, a portion of which is illustratively shown in the form of sensing elements 24, 26 and process valves 28, 30 with the nearby process unit 10. Each device is connected to a respective swept-carrier transmitter/receiver unit 34, 36, 38 and 40 assigned thereto. These units are referred to herein as local transmitter/receiver units (LTRs). Each includes equipment for receiving and tracking the swept-carrier signal developed by the associated ZTR 20, and for transmitting back to that ZTR swept-carrier signals which are received and tracked by the receiver portion of that ZTR unit. The process unit 10 typically will include other instrumentation, the elements of which will be connected to further LTRs illustratively shown at 42, 44. The other process unit 12 will have its own instrumentation, which in turn will be connected to respective LTRs (not shown) for transferring data to and from the other ZTR 22.

Figure 2:
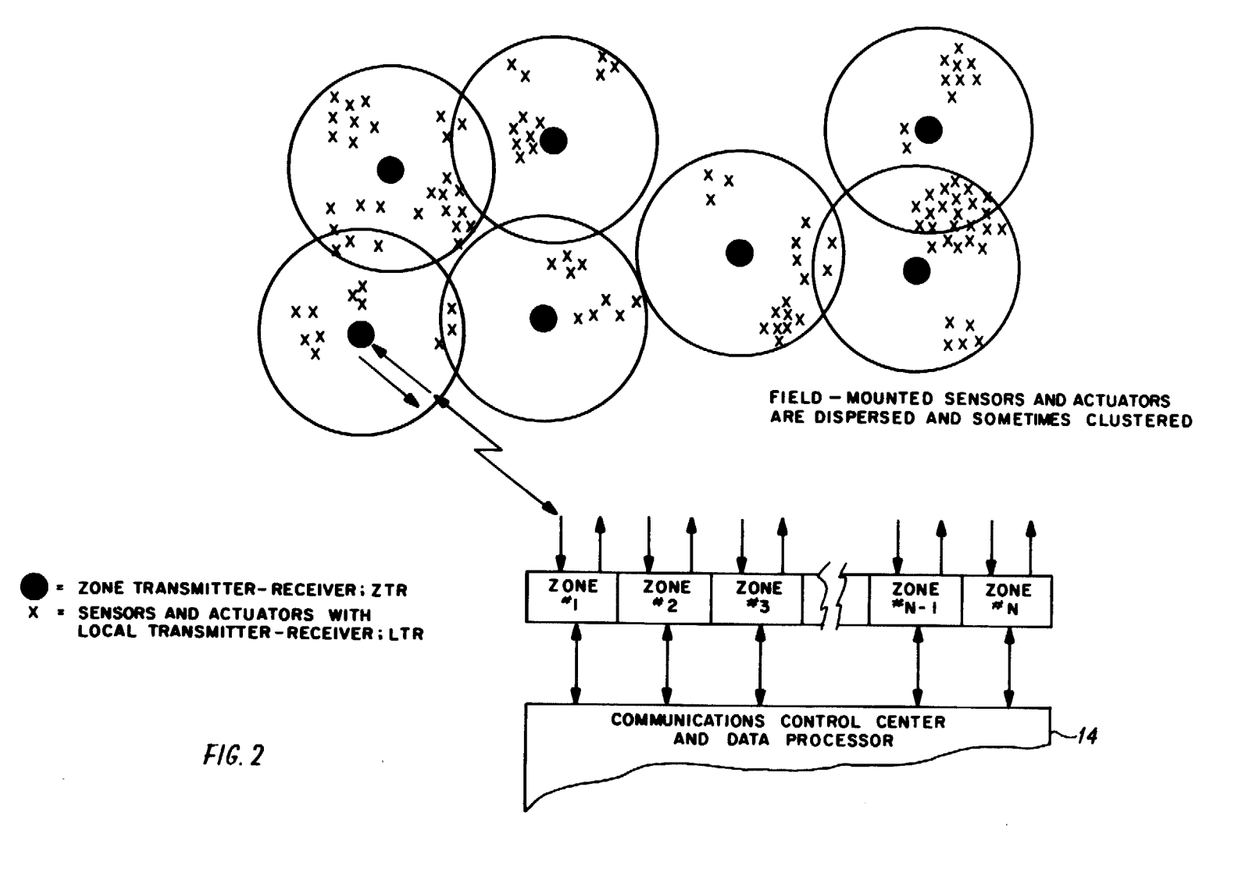
FIG. 2 is a diagrammatic presentation outlining the multi-zone aspect of the process control system.

FIG. 2 illustrates schematically the geographical arrangement and operation of a multi-zone system such as shown pictorially in FIG. 1. Each ZTR is symbolically indicated as a solid dot at the center of a circle zone representing the effective range of the ZTR transmission capability, e.g. having a radius of 200 feet. Sensors and actuators communicating with the ZTRs are indicated by the symbol "X", and as shown may be anywhere within the corresponding ZTR circle zone, often in clusters. The zones may overlap, such that certain LTRs can be found within more than one zone.

Each ZTR is coupled to the central station 14 by a respective link, shown schematically in FIG. 2, and which preferably will be a wired link since typically the amount of wiring required between the central station and the ZTRs will not be excessively great. However, it will be understood that other types of connecting links can be used, including wireless.

Figure 3:
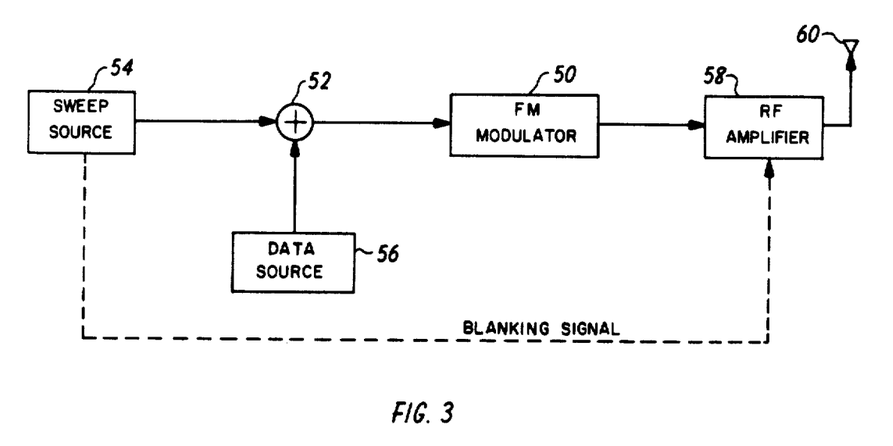
FIG. 3 is a diagram showing a transmitter for producing a periodic swept-carrier wave.

Referring now to FIG. 3, a swept-carrier transmitter includes an FM modulator 50 which receives its modulation signal from a summing device 52 one input of which is connected to a sweep source 54, e.g. producing a sine-wave signal. The summing device also receives at its other input data signals from a data source 56, e.g. producing frequency-shift-keying (FSK) signals. The modulated wave is passed through an RF amplifier 58 to an antenna 60. The transmitter carrier frequency is swept by the sweep signal about a nominal center frequency, and the carrier is additionally frequency-modulated in accordance with the output of the data source 56.

It will be evident to those versed in the art that many variations of this transmitter configuration may be used in practice. For example, the transmitter could comprise frequency-changing means for the FM carrier such as mixers and/or multipliers, and the FM modulator may be the final stage feeding the antenna. Also, the data signal source may be used to amplitude or phase modulate the carrier. In any event, in the absence of a sweep, the modulated carrier would occupy a bandwidth defined by the data modulation sidebands and the uncertainty of the carrier center frequency. With the sweep added, this frequency occupancy would shift up and down throughout the carrier frequency sweep range. The receiver will incorporate tracking means to automatically follow this shifting of the transmitter frequency, so that the net frequency occupancy of the carrier can be filtered through a narrowband sweep-tracking filter.

Figure 4:
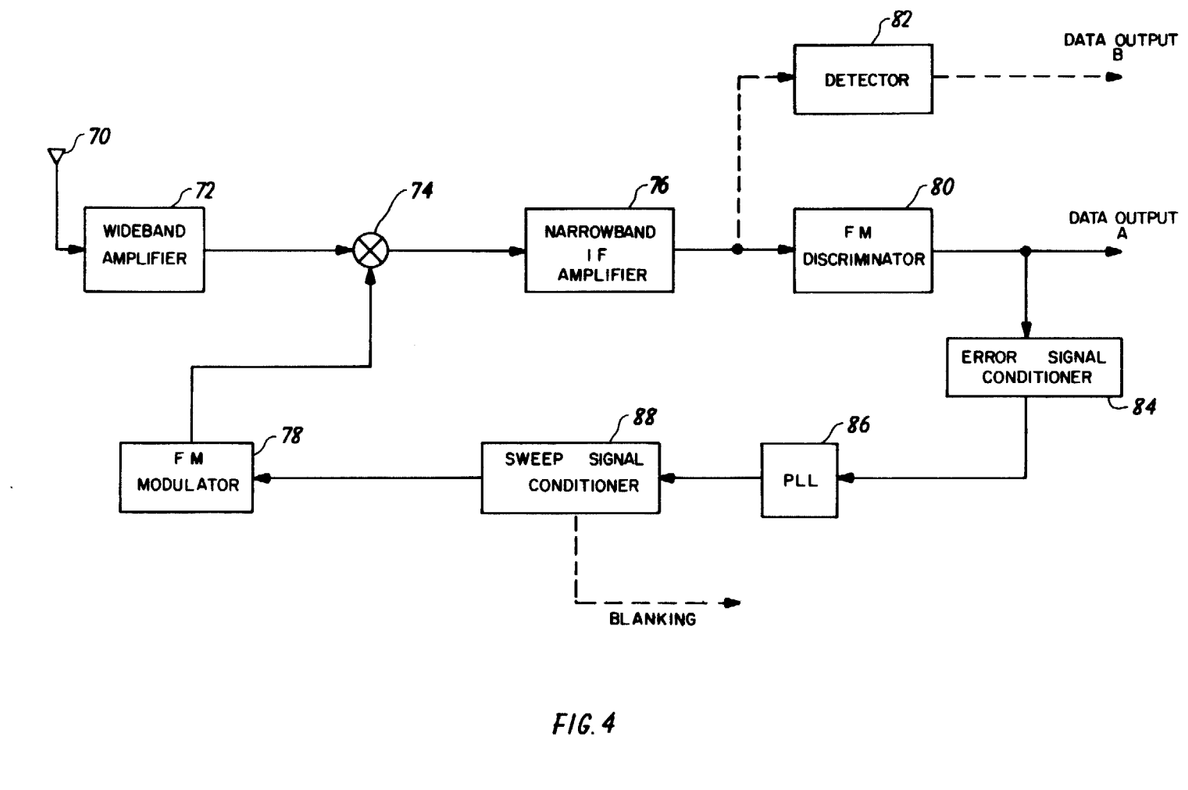
FIG. 4 is a diagram showing a tracking receiver for a periodically-swept carrier.

FIG. 4 shows a receiver capable of tracking the swept-carrier signal from the transmitter of FIG. 3. (Note: Further details on such a receiver will be found in the abovementioned copending application Ser. No. 790,156, abandoned.) The swept carrier received by the antenna 70 is intensified by a wideband amplifier 72 and is fed to one input of a mixer 74 the output of which is fed to an IF amplifier 76 having a relatively narrow pass band. The other input to the mixer 74 is a carrier generated by an FM modulator 78 that is swept in a manner similar to that of the received carrier, but is not modulated by data. For example, the modulator 78 may be a voltage-controlled oscillator producing a carrier the center frequency of which differs from that of the received carrier by the IF center frequency, but wherein the sweep is identical in rate and phase while the sweep range is almost the same as that of the received carrier. The difference-frequency component at the output of the mixer 74 is of the IF center frequency, with only little shift in its center frequency, representing the tracking error signal.

The resulting wave at the input of the IF amplifier 76 is of considerably narrower bandwidth than the full range of the received carrier frequency sweep, and is filtered by the narrow pass band of the IF amplifier. This filtering of the carrier is important in order to eliminate as much as possible all interfering signals before detection of the carrier takes place in a demodulator 80 which in this case is in the form of an FM discriminator. The data on the carrier may be obtained at the output of this discriminator if the carrier was frequency-modulated, or at the output of a separate detector 82 if the modulation was of a different kind.

An important aspect of a sweep tracking receiver is the method by which the tracking is synchronized and made selective to a particular sweep of the incoming carrier. For this purpose in the receiver of FIG. 4, the output of the FM discriminator 80 is applied to a feedback circuit which automatically controls the frequency of the FM modulator 78. The discriminator output provides an error signal related to the frequency deviation of the carrier at its input including a component at the sweep frequency. This component may be appropriately conditioned in accordance with known techniques, i.e. filtered, adjusted in level and shape if necessary, by an error-signal conditioner 84. The conditioned error signal is used to synchronize a phase-locked loop (PLL) 86 which is of narrowband design, thus synchronizing only to the component of the sweep frequency and rejecting all other components of the discriminator output signal. Due to the large time constants associated with a narrowband PLL, it will retain synchronism over a relatively short duration even if the synchronizing signal is interrupted.

The output of the PLL 86 is, by the properties of a synchronized PLL, identical in frequency and fixed in its phase relationship to the sweep signal required to be fed to the FM modulator 78 to maintain tracking of the incoming signal. A sweep signal conditioner 88 may be included to adjust for difference in phase or time delay. In addition, it may be used to attenuate, amplify, and shape the output of the PLL to render it identical in shape to the sweep of the received carrier and appropriate in amplitude for controlling the FM modulator.

As an operating example, consider the case where the received carrier, quiescently at 100 MHz, is being swept in a sinusoidal manner over the range of ±1.0 MHz at a rate of 20 KHz. Consider now that the FM modulator 78 has a quiescent frequency of 90 MHz and a sinusoidal sweep over the range of ±0.99 MHz, but of the same rate and phase as the received carrier. The difference-frequency component at the output of the mixer 74 will be of quiescent frequency 10 MHz, i.e. the IF center frequency, with a sinusoidal sweep range of ±10 KHz, which represents the tracking error signal. Thus the narrowband IF amplifier 76 must be wide enough to accommodate only this remainder of the sweep and the bandwidth due to the modulation imposed by data.

Figure 5:
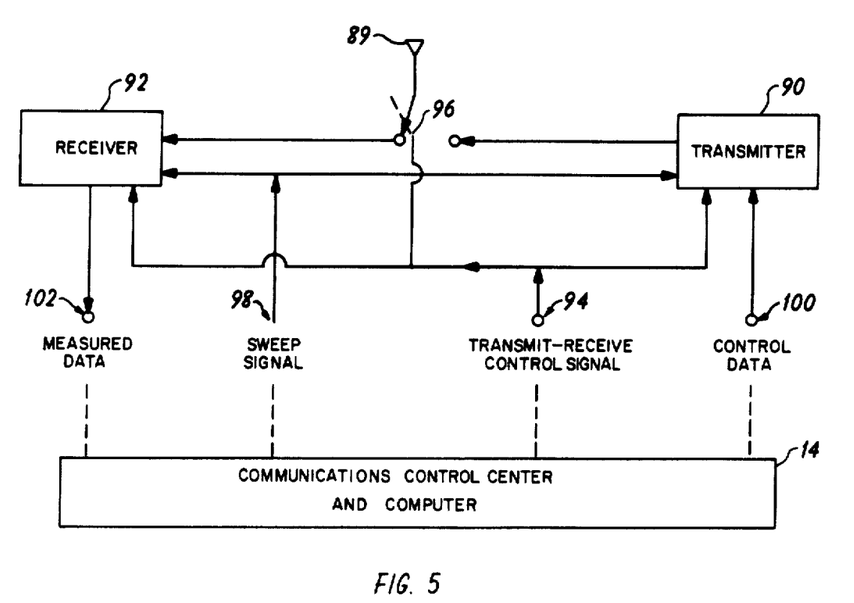
FIG. 5 is a diagram illustrating a zone transmitter/receiver (ZTR) arrangement.
Figure 7:
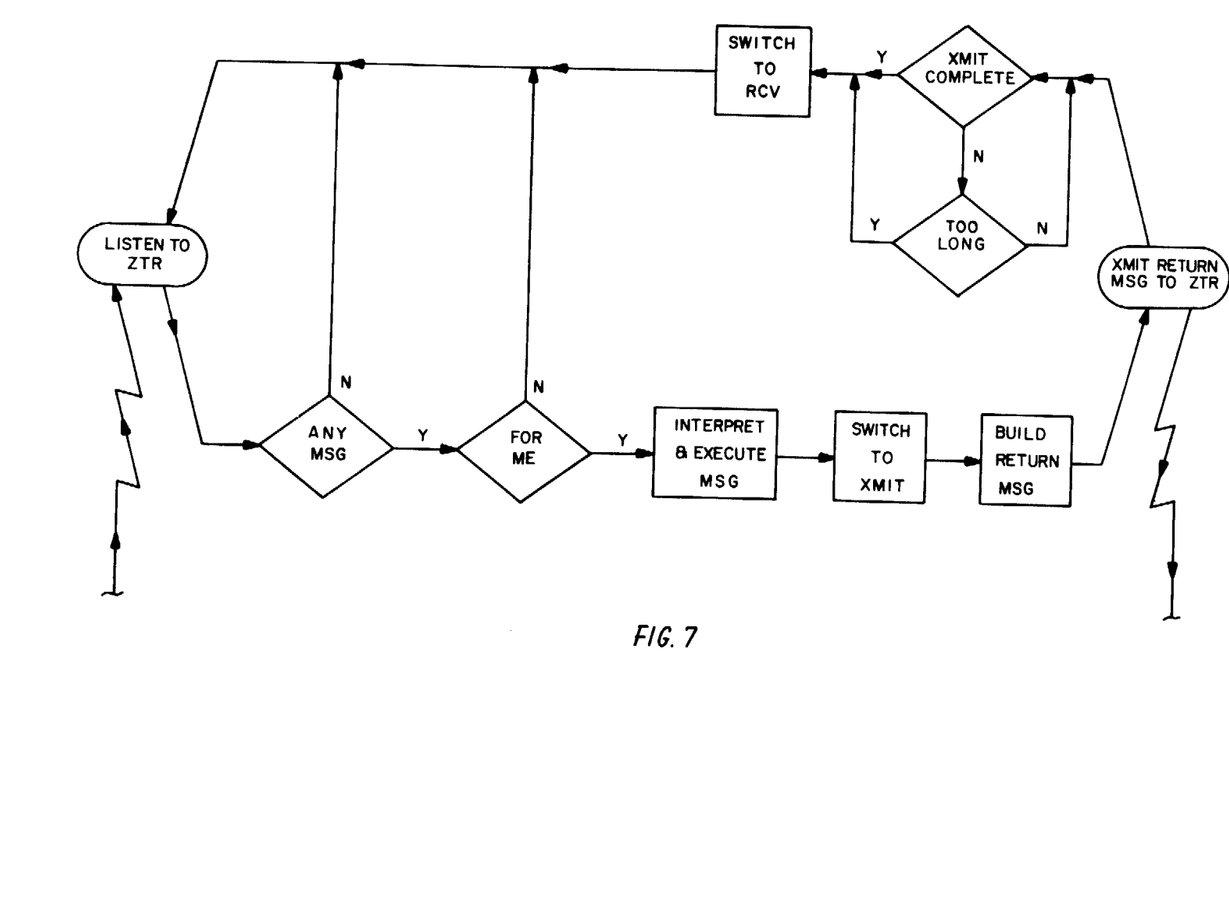
FIG. 7 is a diagram illustrating a sequence of operational steps carried out by a local transmitter/receiver.

Referring now to FIG. 5, there is shown a combined swept-carrier transmitter/receiver unit configured as a primary transmitter/receiver unit, or ZTR. It uses a single antenna 89 for both the transmitter 90 and the receiver 92. The central station 14, serving as a communications center, controls all of the ZTRs including the one illustrated here. It provides through one channel 94 the transmit-receive control signal for activating the transmitter and antenna switch 96 and also provides through another channel 98 a sweep signal to both the transmitter 90 and the receiver 92 to effect system synchronism. The computer at the central station also forwards through a channel 100 command signals to the transmitter for relay to the LTRs, and obtains through a channel 102 the data received by the receiver 92 for processing. Each set of command signals sent to the LTRs will include both address signals, to identify the LTR which is to be the recipient, and instruction signals, specifying the actions to be performed at the LTR. FIG. 7 illustrates the typical sequence of events as the LTRs monitor the ZTR signals, and carry out the instructions contained in the command signals.

Figure 6A:
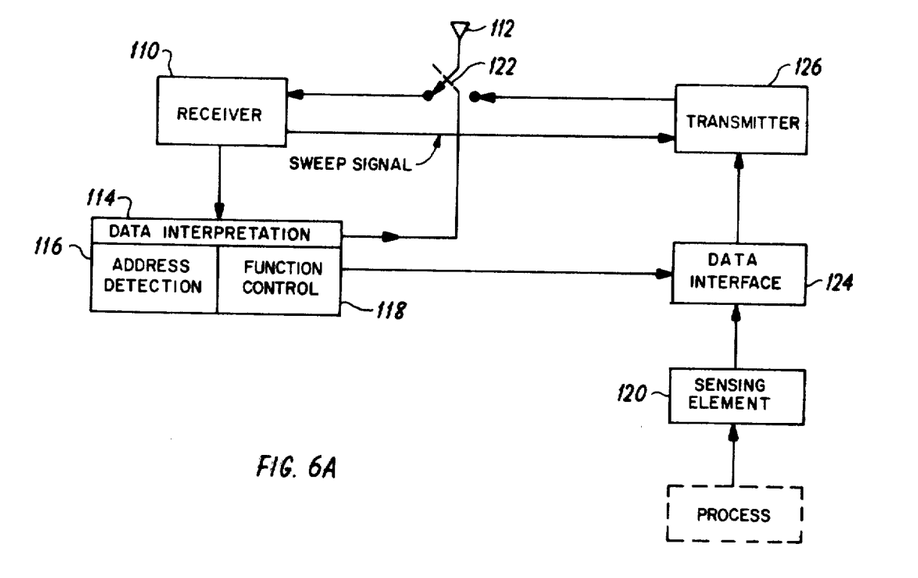
FIGS. 6A and 6B are diagrams illustrating different local transmitter/receiver (LTR) arrangements.

Referring now to FIG. 6A which shows one LTR configuration, the receiver 110 may be of the type described with reference to FIG. 4, and is normally connected to the antenna 112. The demodulated binary data signals it develops are directed to a data interpretation unit 114 using known technology for analyzing each set of command signals which, for example, may take the form of a 100 bit serial signal. The interpretation unit includes an address detection section 116 which decodes the address portion of the message to determine whether the address identifies the particular LTR as the intended recipient. If it does, the address detection section sends a logic signal in the usual way to a function control section 118 which, in response thereto and to the received instruction signal portion of the data signals, carries out the required action steps by means of conventional logic circuitry. The details of such circuitry will be evident to one of skill in this art, and thus are not described herein in order to simplify the disclosure. In FIG. 6A configuration, the instruction may be to read out the measurement signal from one or more sensing elements 120, and for that purpose the function control section sends a switchover signal to the antenna switch 122, and an enabling signal to a data interface 124 which, in turn, builds an appropriate digital return message which is directed to the transmitter 126 for relay on to the ZTR.

In this illustration, no more than one LTR replies to the ZTR at each instant of time. The return message may typically be of relatively short duration so that the receiver 110 does not lose sweep synchronism with the ZTR as a consequence of the brief interruption of reception while the LTR is in the transmit mode. A short-term sweep memory for this purpose may if desired be provided by the narrowband PLL 86 as described earlier. From this sweep memory, the receiver may feed the sweep signal to the transmitter 126. Since the sweep of the sweep memory of the receiver 110 is synchronized with the sweep signal from the central station (see FIG. 5), the receiver 92 at the ZTR need not be provided with means for automatically tracking the swept carrier from the LTR because that tracking function can be performed by the already-available sweep signal at the ZTR.

Figure 6B:
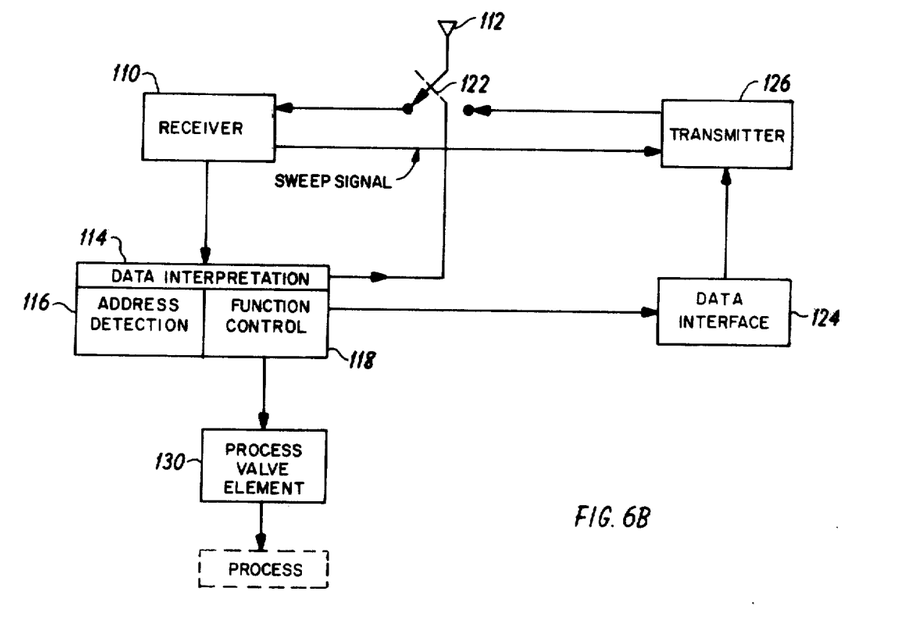

FIG. 6B shows an alternate form of LTR which is configured for use in controlling a process valve or similar actuator. As before, the data signals are directed to a data interpretation unit 114. If the address detection section of that unit detects its own address, the function control section will be activated as before to develop a control signal which is sent to a process valve element 130. This element, which may comprise a valve actuator or some other form of control device, positions its associated process valve to a specified position or degree of movement. The function control may also direct signals to the data interface 124, instructing that unit to build a return message for the ZTR, e.g. indicating the actual position of the valve. Such an LTR also can be used to control a group of valves, to provide increased efficiency.

Alternatively, the LTR of FIG. 6B can be used to direct signals to one or more operating elements in the form of process controllers rather than a valve element as shown in the drawing. Thus the instruction signals sent to the LTR may comprise set-point signals for such controllers, which also would be supplied with measurement signals from associated sensing elements. Each controller would in known fashion produce control signals for an associated process valve or the like. Such a controller arrangement is pictorially illustrated at 140 in FIG. 1. The transmitter portion of the LTR could, in such an example, be used to transmit the measurement signal data back to the ZTR.

Reverting to FIG. 2, it will be understood that in a multi-zone system there normally will be transmissions in all zones simultaneously. Advantageously these transmissions may cover nearly-fully or fully overlapping frequency bands, and in such a case it may be desirable to arrange the system so that there can be no interference between these transmissions. In accordance with one aspect of this invention, such result is effected by an arrangement wherein, on an instantaneous basis, each of the transmissions is at a different frequency.

Figure 8:
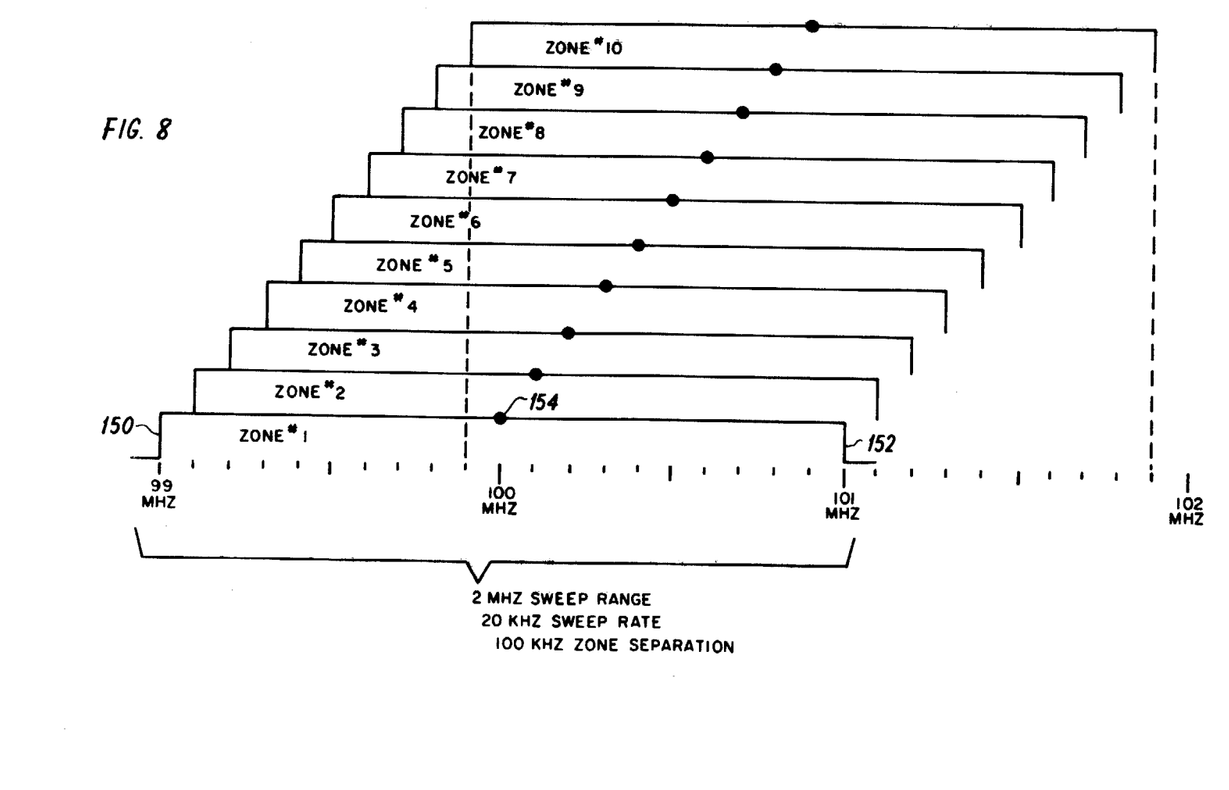
FIG. 8 is a diagram illustrating the frequency occupancy of one type of multi-zone system.

FIG. 8 illustrates one such arrangement for assuring that all transmissions will be instantaneously at different frequencies. Assume for the sake of illustration that zone #1 occupies the frequency band from 99 MHz to 101 MHz, i.e., the carrier of zone #1 has a center frequency of 100 MHz and is swept over a range of ±1.0 MHz. Assume further that zone #2 is assigned the frequency band from 99.10 MHz to 101.10 MHz, i.e., it has the same width of band as zone #1 but is displaced upwards by 100 KHz. Continuing in this manner, each successive zone is shifted upwards by 100 KHz producing a staggered arrangement of assigned zone frequency bands. In this manner, a 10 zone system occupies the frequency band from 99 MHz to 101.9 MHz. The sweep rate would generally be slow, say 20 KHz; therefore, the center frequency of the carriers may be assumed to move in accordance with the sweep wave form.

The data superimposed on the carrier is also assumed to occupy a bandwidth which is very small compared to the ±1.0 MHz sweep. In particular, it is assumed in the example that the modulation sidebands together with the reduced sweep as obtained at the output of the mixer 74 in FIG. 4 occupy a band of less than the spacing between the zones, i.e. less than 100 KHz. Due to the common sweep signal which is connected to all ZTRs, and the synchronism of the system, the 100 KHz separation between the zones remains throughout the sweeping pattern at every instant of time. The carrier frequencies of the zones move in unison from the left edge 150 until reaching the right edge 152 and then back. At any intermediate point, such as 154, the carrier frequencies are still 100 KHz apart; therefore, there can be no interference between any transmissions even though overall they overlap in frequency. This is true for any sweep shape as long as it is the same for all zones in the system.

The center frequencies of the receivers 110 will be displaced by the same intervals as the transmissions. These receivers may for example incorporate in the sweep signal conditioners 88 known devices for limiting the sweep signal to be within a prescribed range, to assure that the frequency of the FM modulator always will remain in the specified range for its associated ZTR. To simplify acquisition of the ZTR carrier, the receivers also may be provided in their PLLs with controlled oscillators which when quiescent-running set the basic sweep frequency of the FM modulator 78 at a value which is very nearly exactly equal to the sweep frequency of the incoming carrier, so that the feedback action of the PLL has only to provide a trimming function.

Figure 9:
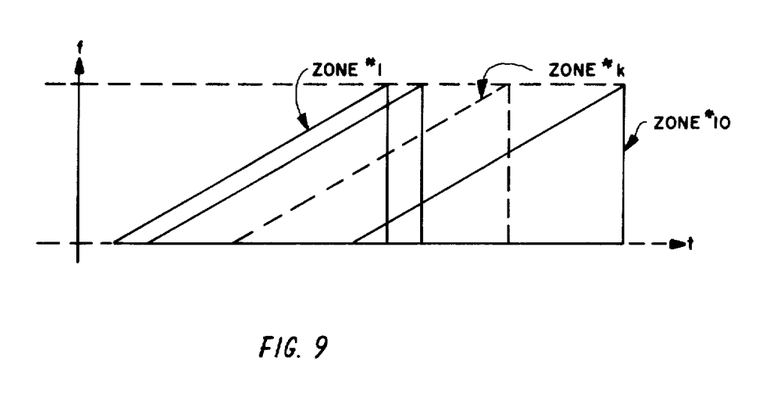
FIG. 9 is a diagram illustrating the sweep pattern of another type of multi-zone system.
Figure 10:
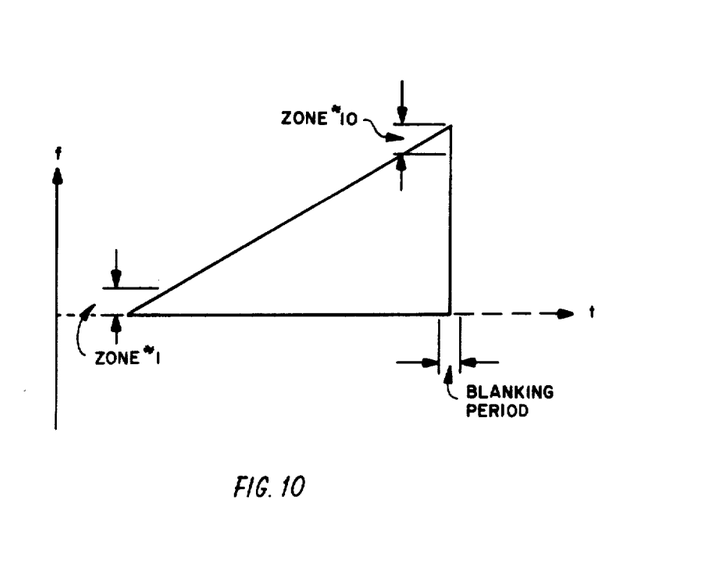
FIG. 10 is a diagram illustrating the frequency occupancy of the system of FIG. 9.

Referring now to FIG. 9, in another multi-zone arrangement, the center frequencies of the zones are the same, but the sweep in each zone is assigned a different phase. Thus the instantaneous center frequencies are here also different for each zone, at least in the forward part of the cycle. FIG. 10 shows that in this arrangement when zone #1 is at the beginning of the band, then the highest zone is at the other edge of the band. There could be interference, however, during the return portion of the cycle. Therefore, the sweep waveshape should provide a fast return and the illustration is for a sawtooth wave. In addition, blanking may be used in the transmitter to prevent transmission during the return portion of the sweep as indicated in FIG. 3. Also, in the receiver, this part of the data may be blanked by a signal derived from the sweep signal conditioner 88 in FIG. 4. This form is more efficient in bandwidth since the frequency bands of the zones are fully overlapping.

With reference again to FIG. 3, the data source may for example produce a binary stream of two different positive levels of a much smaller amplitude than that of the output of the sweep source 54. For example, while the sweep source may produce a carrier sweep of ±1.0 MHz range with a sweep rate of 20 KHz for a 100 KHz separation between zones, a data rate of 10 KHz could be utilized. Thus, in the receiver, at the output of the FM discriminator 80 (FIG. 4), the data and sweep signals can be separated for example by means of filters since their frequencies are selected to be appropriately different.

Although preferred embodiments of the invention have been described herein in detail, it is desired to emphasize that this is for the purpose of illustrating the principles of the invention, and should not necessarily be construed as limiting of the invention since it is apparent that those skilled in this art can make many modified arrangements of the invention without departing from the true scope thereof. For example, although a common sweep signal is developed at the central station for use by all of the ZTRs, alternatively the central station could be arranged to develop synchronizing clock pulses to be sent to all of the ZTRs to control individual sweep generators at those units. Also, although a fully synchronized system is preferred for obtaining the many important advantages resulting from instantaneously different carrier frequencies, in accordance with the disclosure, in certain applications where inter-zone interference may not be so severe it is possible to obtain satisfactory performance using non-synchronized zone transmitter/receiver units, that is, having random sweep relationships between zone transmitters.

I claim:

1. An industrial process control system for use with a complex process wherein portions of the process are spread out over a field area region and wherein the process has a number of variables to be controlled; there being a number of sensing elements for developing measurement signals reflecting the status of corresponding conditions, and actuators with operating elements associated therewith; said control system comprising:

(1) a central station having a digital computer for carrying out data processing steps and for producing command signals for predetermined process elements including address signals identifying any paticular element and instruction signals indicating specified actions to be taken with respect to an identified element;

(2) a plurality of zone transmitter/receiver units coupled to said central station to receive command signals from said digital computer; each of said transmitter/receiver units being physically located in proximity to a respective distinctive zone of said field area containing a corresponding set of said process elements; each of said zone transmitter/receiver units including:
  (a) means for developing a zone output signal capable of transmission to the limits of the region of the respective zone;
  (b) means for modulating said output signal with data signals corresponding to said common signals;
  (c) means to receive signal carrying data signals from the respective zone region representing information to be forwarded on to said digital computer;
  (d) means to demodulate said data signals received from the respective zone region to produce information signals for said digital computer;
(3) a plurality of sets of local transmitter/receiver units in said field area remote from said central station, each such set being located in a respective zone region with the individual units thereof assigned to at least one respective process element; each of said local transmitter/receiver units comprising:
  (a) means to receive the zone signal developed and transmitted by the zone transmitter/receiver unit assigned thereto;
  (b) means to demodulate the command data signals carried by the received zone signal;
  (c) function means for carrying out the actions represented by the instruction signals incorporated in said command data signals;
  (d) means for transmitting a local output signal to be received by the zone transmitter/receiver unit for the respective zone;
  (e) means to modulate said local output signal with local data signals reflecting information to be conveyed to said digital computer;
  (f) means responsive to the address signal part of said command data signals to activate said function means when the address signals identify the respective local units as the recipient; said function means further comprising means for developing transmit control signals to activate said transmitting means to transmit a data-modulated local output signal to the assigned ZTR when required by the instruction signals received from the zone transmitter/receiver.

2. A system as claimed in claim 1, wherein said transmitter/receiver units all produce high-frequency carrier signals for wireless transmission.

3. A system as claimed in claim 1, wherein said transmitter/receiver units all produce swept-carrier output signals to be modulated by the respective data signals.

4. A system as claimed in claim 3, wherein said transmitter/receiver units produce wireless signals.

5. A system as claimed in claim 1, wherein said zones overlap slightly with one or more local transmitter/receiver units positioned in more than one zone so as to receive more than one zone signal of sufficient power to be received and demodulated; and
means for preventing any local transmitter/receiver unit from responding to zone transmissions of more than one zone transmitter unit.

* * * * *